United States Patent
Yu

Patent Number: 5,509,983
Date of Patent: Apr. 23, 1996

[54] METHOD OF MAKING FIRE-RESISTING SYNTHETIC BOARDS

[76] Inventor: Te-Fang Yu, No. 622, Chien Kung Rd., Kaohsiung, Taiwan

[21] Appl. No.: 508,887

[22] Filed: Jul. 28, 1995

[51] Int. Cl.⁶ .................................................... B05D 3/02
[52] U.S. Cl. ...................... 156/79; 427/393.3; 427/243; 106/18.21; 428/921
[58] Field of Search .................... 156/79; 427/393.3, 427/243, 176; 106/18.11, 18.21; 428/920, 921, 245, 246; 264/42, 45.1, 45.8

[56] References Cited

U.S. PATENT DOCUMENTS 2,889,235  6/1959  Campbell et al. ....................... 117/72
4,552,803  11/1985  Pearson ............................. 427/393.3 X
5,091,243  2/1992  Tolbert et al. ..

*Primary Examiner*—Michael W. Ball
*Assistant Examiner*—Sam Chuan Yao
*Attorney, Agent, or Firm*—Varndell Legal Group

[57] ABSTRACT

A method of making fire-resisting synthetic boards including steps of dipping two pieces of fabric in a coating material prepared by mixing clay powder with a urea, water, a stabilizing agent, latex, sodium chloride, and a pigment; bonding the coated fabrics together by an intermediate bonding material prepared by mixing clay powder with urea, water, sodium chloride, and a stabilizing agent, so as to obtain a blank; drying the blank thus obtained in a kiln permitting the intermediate bonding material to form into a foamed structure and then surface treating the board thus obtained into a finished product.

1 Claim, 4 Drawing Sheets

METHOD OF MAKING FIRE-RESISTING SYNTHETIC BOARDS

BACKGROUND OF THE INVENTION

The present invention relates to a method of making synthetic fire-resisting boards for use in construction.

Wooden boards and plywoods are commonly used in construction and upholstery. Because these construction materials are inflammable, they must be covered with a layer of fire-resisting coating. However, simply covering a wooden board or plywood with a layer of fire resisting coating can not effectively isolate the fire. Therefore, these materials have been gradually abandoned and replaced by fire-resisting materials.

SUMMARY OF THE INVENTION

The present invention has been accomplished under the aforesaid circumstances. The method of the present invention is provided for making fire-resisting synthetic boards, which also provide a stisfactory sound-proof effect, suitable for use in construction and upholstery. The method comprises steps of dipping two pieces of fabric in a coating material prepared by mixing clay with urea, water, a stabilizing agent, latex, sodium chloride, and a pigment; bonding the coated fabrics together by an intermediate bonding material prepared by mixing clay powder with urea, water, sodium chloride, and a stabilizing agent, so as to obtain a blank; drying the blank thus obtained in a kiln and simultaneously compressing the board causing the intermediate bonding material to foam. After surface treating, a finished product is thus obtained.

DETAILED DESCRIPTION OF THE PREFERRED EMBODIMENT

A fire-resisting synthetic board made according to the present invention is generally comprised of two opposite outer layers (1;10), and an intermediate layer (19) bonded between the two opposite outer layers. The outer layers are made of fabrics dipped in a coating material. The intermediate layer is made of an intermediate bonding material.

The coating material for coating the fabrics is composed of clay (40–60%), urea (20–40%), a stabilizing agent (1–5%), water (5–10%), sodium chloride (10–15%), a pigment (5–10%), and latex (5–10%). The intermediate bonding material is composed of clay (50–70%), urea (20–35%), water (5–10%), sodium chloride (5–10%), and a stabilizing agent (1–5%).

Figure 1:
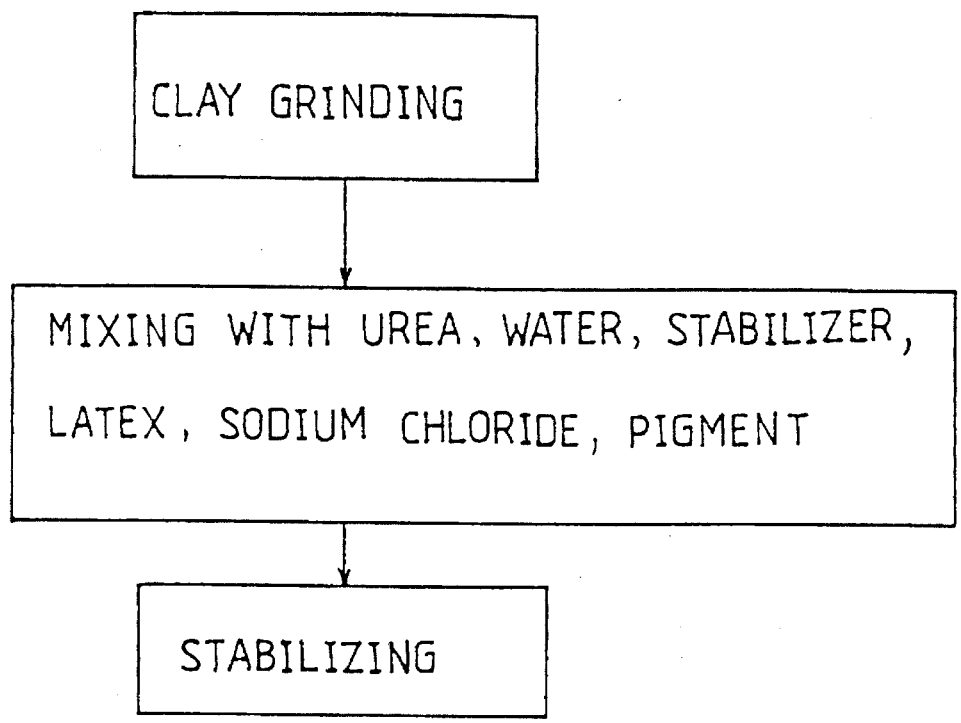
FIG. 1 is a flow chart showing the production of a coating material according to the present invention.

The coating material for coating the fabrics is made according to the following procedure with reference to FIG. 1:

I) grinding dried clay into powder and then using a screen to filtrate impurities from the clay powder thus obtained;

II) mixing the clay powder thus obtained with urea, water, a stabilizing agent thoroughly, then adding latex, sodium chloride, and a pigment to the mixture and then mixing them thoroughly, and therefore the desired coating material is prepared;

III) putting the coating material thus obtained into a mixing tank and adding a bubble eliminating agent to the mixing tank while mixing; and IV) delivering the well mixed coating material from the mixing tank to the respective material troughs (11;12) in the production line.

Figure 2:
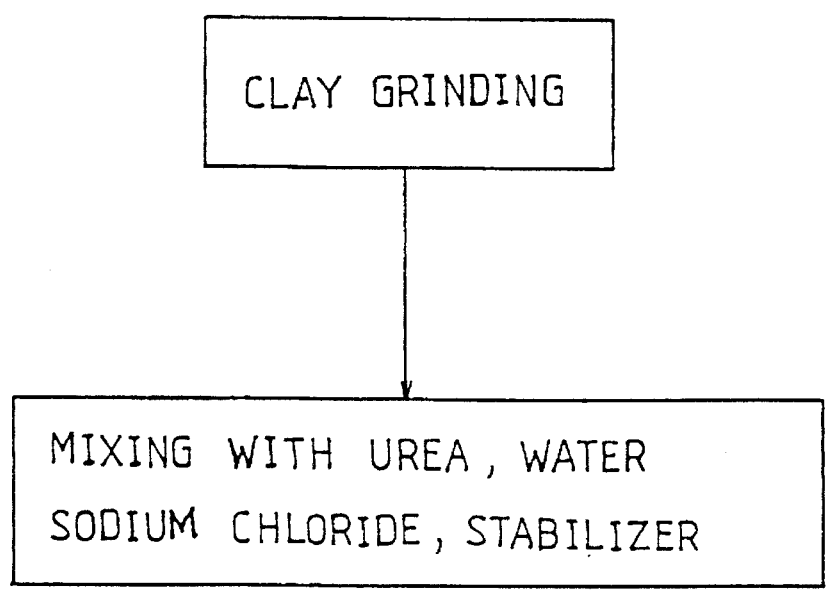
FIG. 2 is a flow chart showing the production of an intermediate bonding material according to the present invention.

The intermediate bonding material for making the intermediate layer is made according to the following procedure with reference to FIG. 2:

I) grinding dried clay into powder and then using a screen to filtrate impurities from the clay powder thus obtained;

II) mixing the clay powder thus obtained with urea and water, then adding sodium chloride and a stabilizing agent to the mixture and mixing them thoroughly, therefore the desired intermediate bonding material is prepared; and III) the prepared intermediate bonding material is delivered to the respective material trough (19) in the production line.

Figure 3:
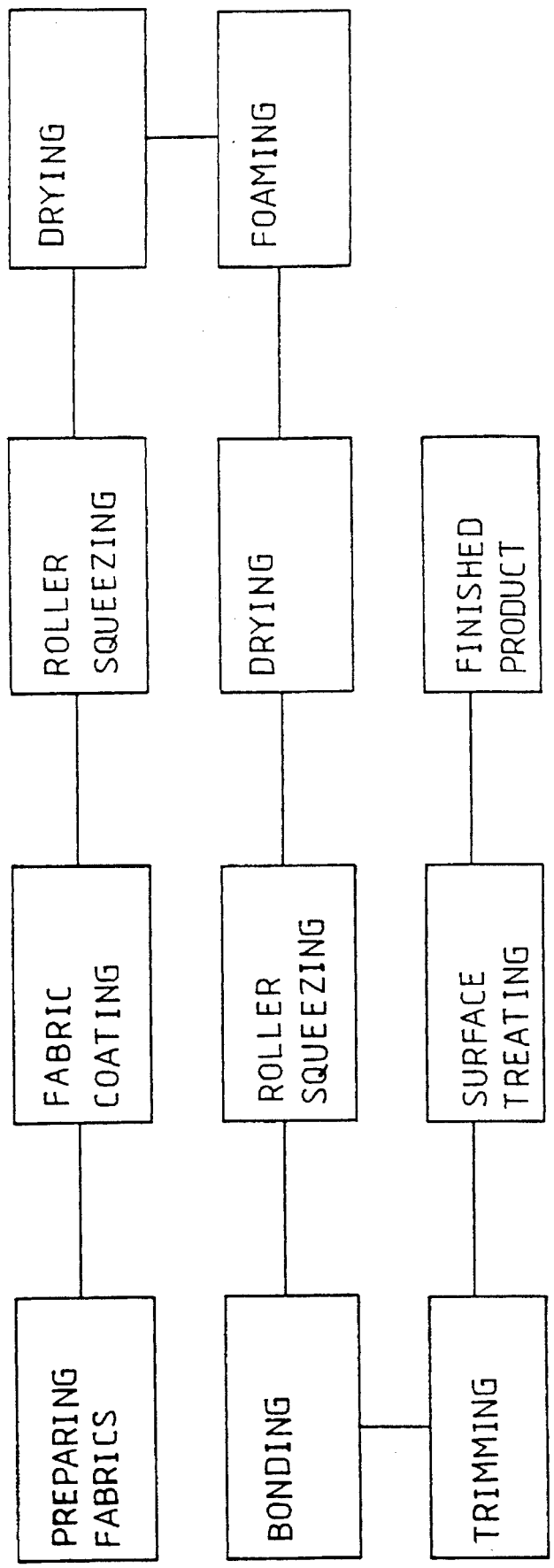
FIG. 3 is a flow chart showing the production of a fire-resisting synthetic board according to the present invention.
Figure 4:
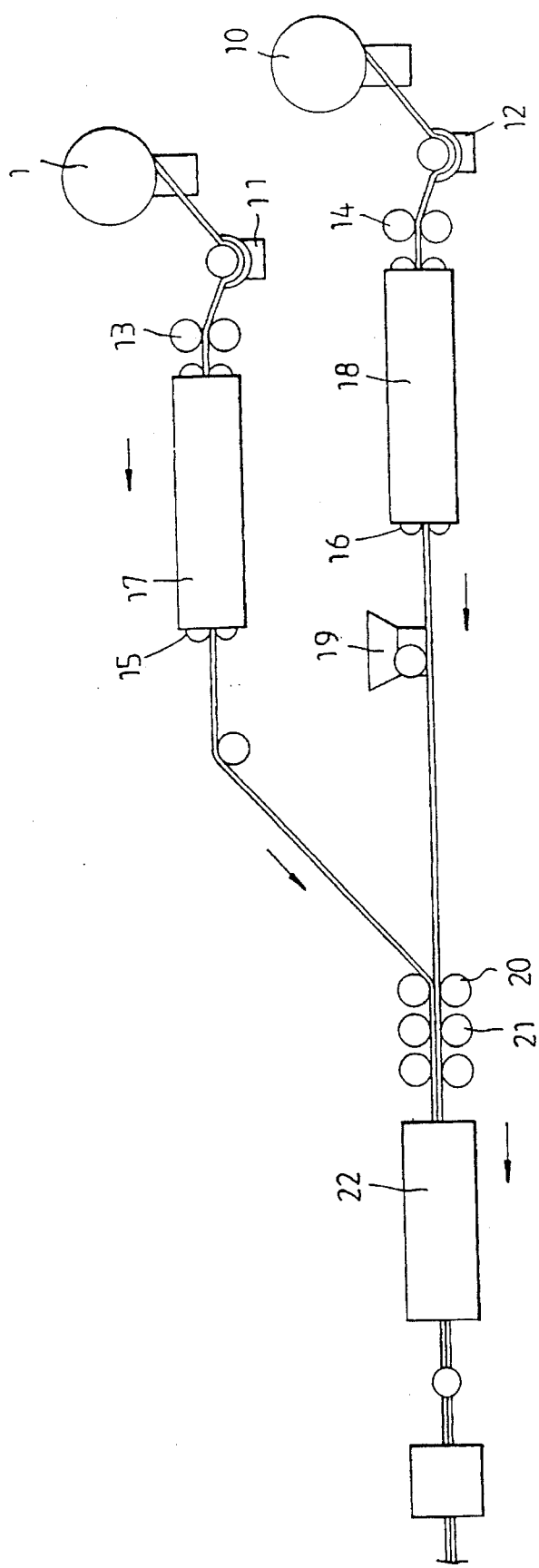
FIG. 4 is a plain view of a production line according to the present invention.
Figure 5:
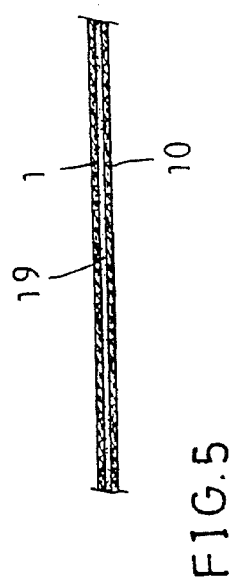
FIG. 5 is a cross section of a fire-resisting synthetic board made according to the present invention.
Figure 6:
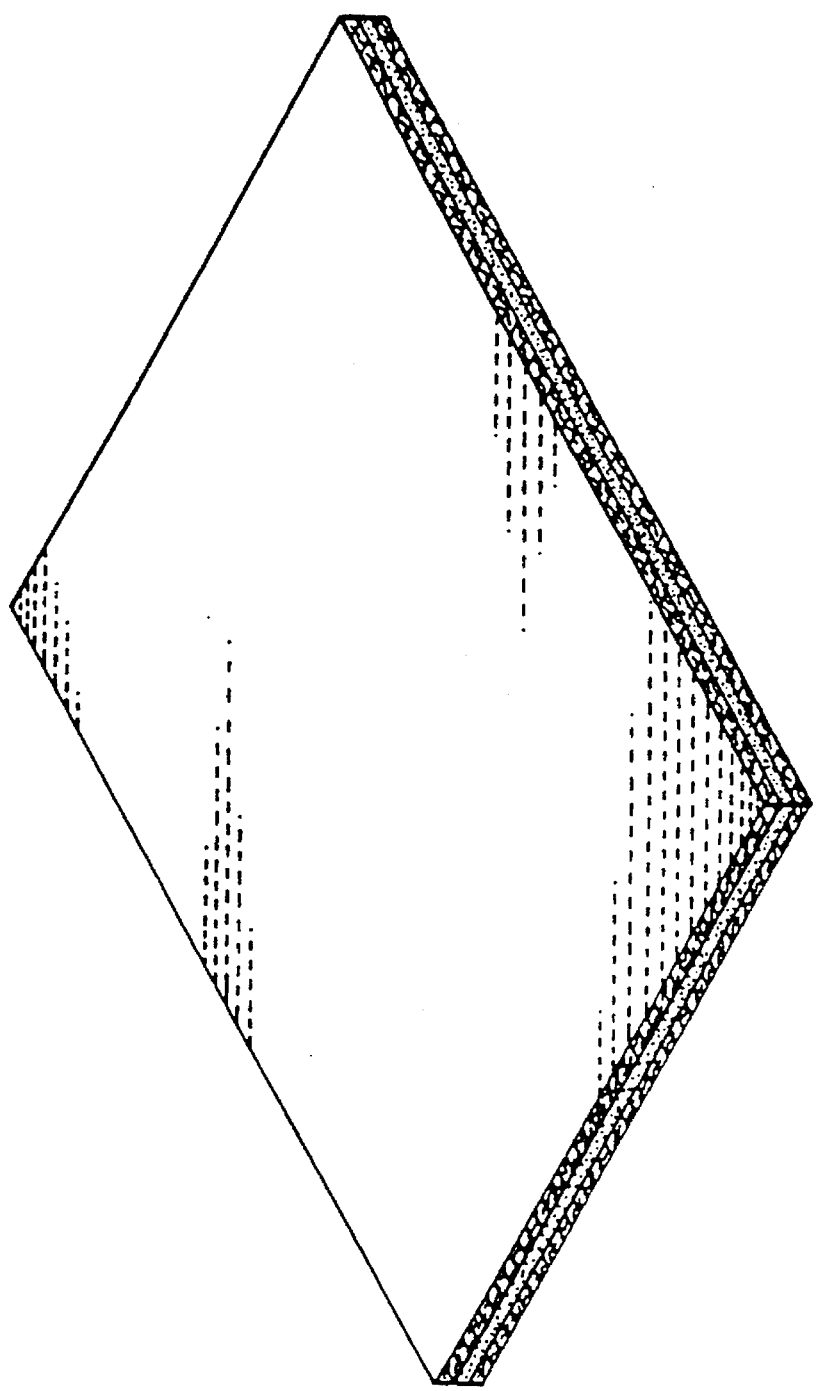
FIG. 6 shows samples of the fire-resisting synthetic board made according to the present invention.

Referring to FIGS. 3, 4, and 5, the production process of the fire-resisting synthetic boards comprises steps of:

I) placing fabrics (1;10) on the two vertically spaced input ports of the machine table (the width of the fabrics is set according to the width of the fire-resisting synthetic boards to be made plus edges for trimming);

II) sending the fabrics (1;10) through the material troughs (11;12) permitting them to be coated with the coating material;

III) sending the coating material coated fabrics through the gap between a respective pair of pitch-fixed rollers (13 or 14), permitting the coating material coated fabrics to be squeezed into a uniform thickness;

IV) delivering the coating material coated fabrics through a respective drying tank (17 or 18) by a respective chain conveyer (15 or 16), for permitting the coating material coated fabrics to be dried;

V) covering the top surface of the coating material coated fabric at the lower elevation with the prepared intermediate bonding material being supplied from the material trough (19), for permitting the two coating material coated fabrics to bond together when passing through impression cylinders (20), and therefore a blank board is prepared;

VI) squeezing the blank board thus to the desired thickness by pairs of pitch-fixed rollers (21), then sending the blank board to a kiln (22) for drying;

VII) compressing the blank board when it is being dried in the kiln (22) permitting the intermediate layer (the intermediate bonding material) of the blank board to form into a foamed structure (the bigger the pressure is applied the higher the density of the intermediate layer will be) (see sample I);

VIII) glazing or painting the blank board or covering it with a paper, leather, plastic veneer, and therefore a finished product is obtained (see sample II); and X) cutting the surface treated board thus obtained into the desired size.

A fire-resisting synthetic board made according to the present invention provides a satisfactory sound-proof effect. It can be used as a floor tile, partition board, ceiling board, etc.

I claim:

1. A process for making fire-resisting synthetic board, comprising the steps of:

A: preparing a coating material by: (i) grinding dried clay into powder and then using a screen to filter impurities from the clay powder thus obtained; (ii) mixing 40–60% of the clay powder thus obtained with 20–40% urea, 5–10% water, 1–5% stabilizing agent, 5–10% latex, 10–15% sodium chloride, and 5–10% pigment to form a mixture; (iii) putting the mixture thus obtained into a mixing tank and adding a bubble eliminating agent to the mixing tank for mixing with the mixture into the desired coating material;

B: preparing an intermediate bonding material by: (i) grinding dried clay into powder and then using a screen to filter impurities from the clay powder thus obtained; (ii) mixing 50–70% of the clay powder thus obtained with 20–35% urea, 5–10% water, 5–10% sodium chloride, and 1–5% stabilizing agent;

C: dipping two pieces of fabric into the prepared coating material;

D: squeezing the coated fabrics to a predetermined thickness;

E: drying the coated fabrics;

F: bonding the dried, coated fabrics together by interposing a layer of the intermediate bonding material between the dried, coated fabrics; and then squeezing the dried, coated fabrics together with the intermediate bonding material therebetween, so as to form a blank board; and G. drying and squeezing the blank board in a kiln, causing the layer of the intermediate bonding material to foam into a foamed structure.

* * * * *